US008714946B2

(12) United States Patent
Barito et al.

(10) Patent No.: US 8,714,946 B2
(45) Date of Patent: May 6, 2014

(54) LINEAR COMPRESSOR WITH AN ELECTRO-MAGNETIC SPRING

(75) Inventors: Thomas R. Barito, Louisville, KY (US); Natarajan Venkatakrishnan, Louisville, KY (US); Mariano Pablo Filippa, Louisville, KY (US); Gregory William Hahn, Mt. Washington, KY (US); Srinivas Mallampalli, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/614,655

(22) Filed: Sep. 13, 2012

(65) Prior Publication Data
US 2014/0072461 A1   Mar. 13, 2014

(51) Int. Cl.
F04B 17/04 (2006.01)
H02K 33/18 (2006.01)

(52) U.S. Cl.
USPC ............................. 417/417; 310/17; 310/20

(58) Field of Classification Search
USPC ......... 417/415, 417; 310/12.19, 12.24, 12.31, 310/14, 15, 20, 17
See application file for complete search history.

(56) References Cited

U.S. PATENT DOCUMENTS

| 4,945,269 A | 7/1990 | Kamm |
| 5,017,819 A * | 5/1991 | Patt et al. ..................... 310/90.5 |
| 5,148,066 A * | 9/1992 | Beale et al. ..................... 310/17 |
| 6,326,706 B1 * | 12/2001 | Zhang ........................ 310/12.31 |
| 2011/0056235 A1 | 3/2011 | Hoshino et al. |
| 2012/0207628 A1 | 8/2012 | Al Otaibi |

FOREIGN PATENT DOCUMENTS

| DE | 102006009256 A1 | 8/2007 |
| WO | 2007067704 A2 | 6/2007 |
| WO | 2011079330 A1 | 7/2011 |
| WO | WO 2011/137501 A2 | 11/2011 |

OTHER PUBLICATIONS

International Search Report issued in connection with corresponding PCT Application No. PCT/US2013/055992 on Nov. 19, 2013.

* cited by examiner

Primary Examiner — Devon Kramer
Assistant Examiner — Nathan Zollinger
(74) Attorney, Agent, or Firm — Dority & Manning, P.A.

(57) ABSTRACT

A linear compressor is provided. The linear compressor includes an electro-magnetic spring and a casing that defines a chamber. A piston is received within the chamber of the casing. The electro-magnetic spring can apply a non-linear force to the piston such that a total spring force applied to the piston during a compression stroke is substantially linear.

20 Claims, 12 Drawing Sheets

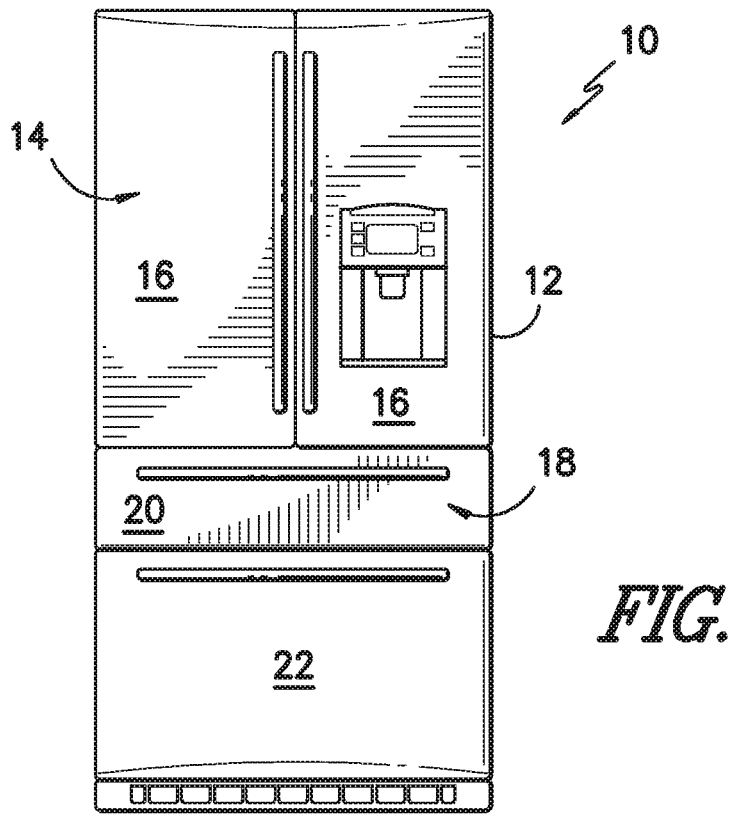
FIG. -1-
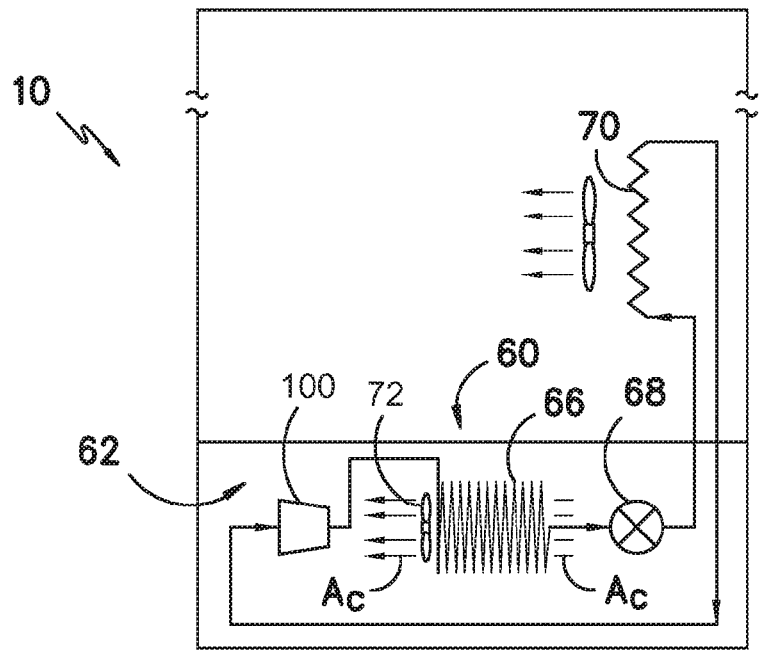
FIG. -2-

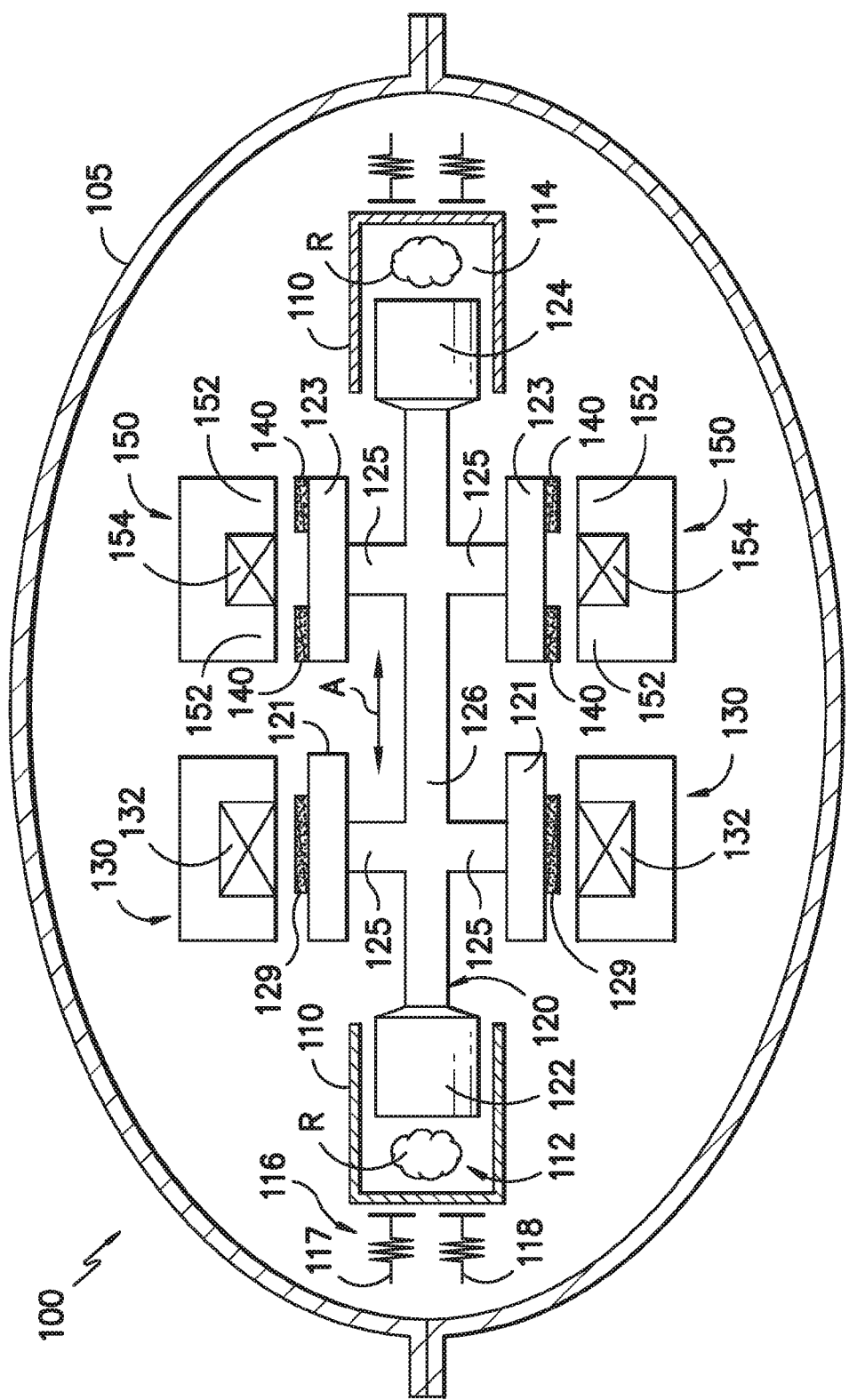
FIG. -3-

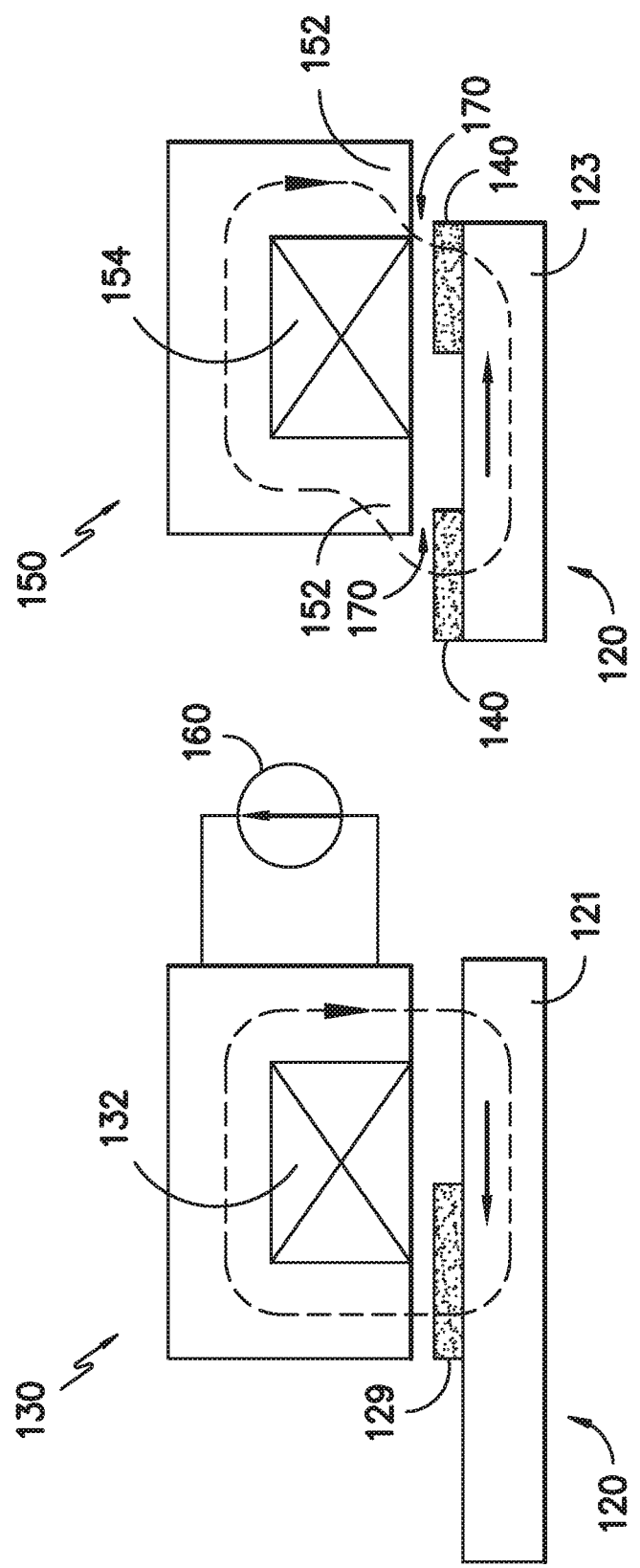
FIG. -4-
FIG. -5-

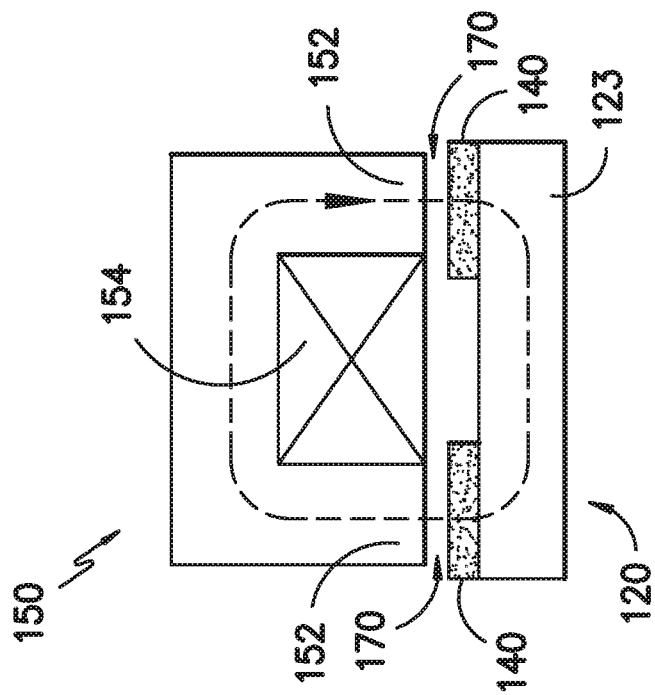
FIG. -7-
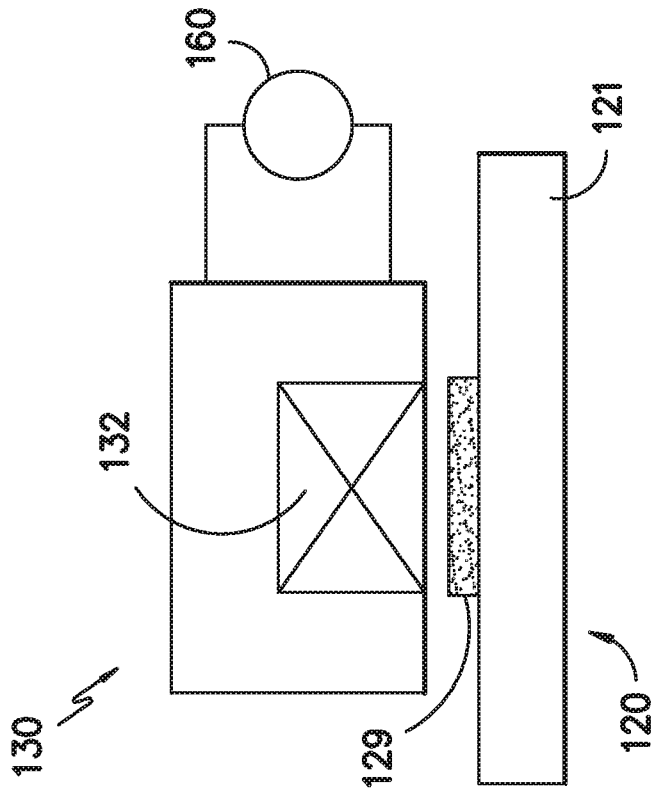
FIG. -6-

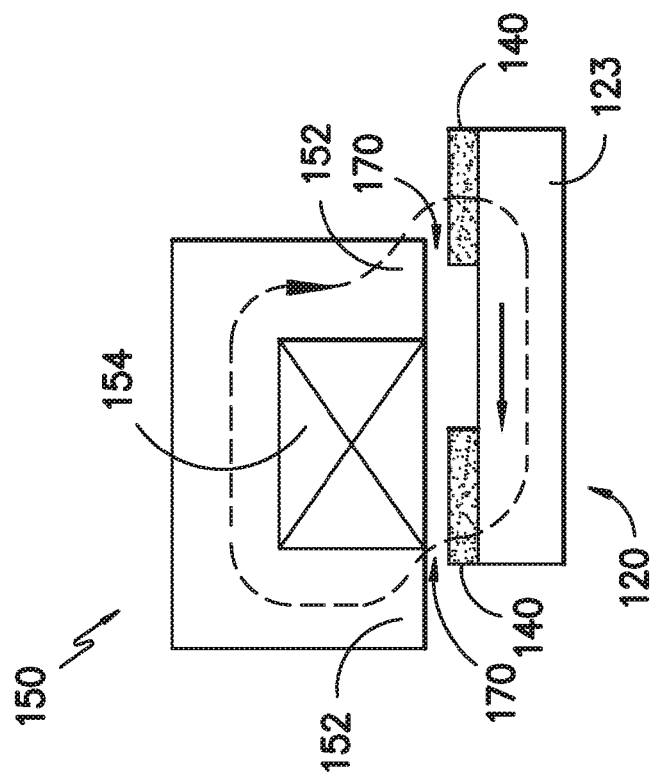
FIG. -9-
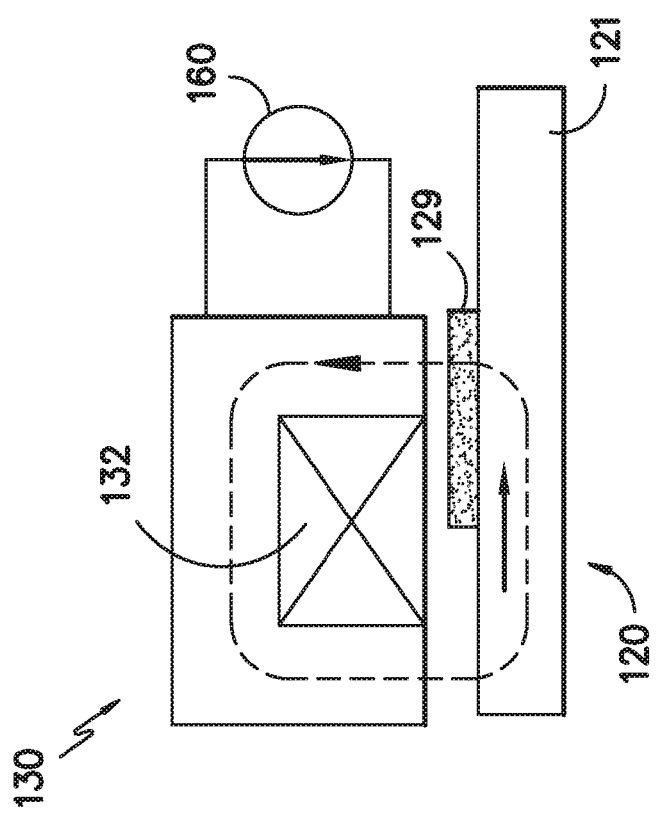
FIG. -8-

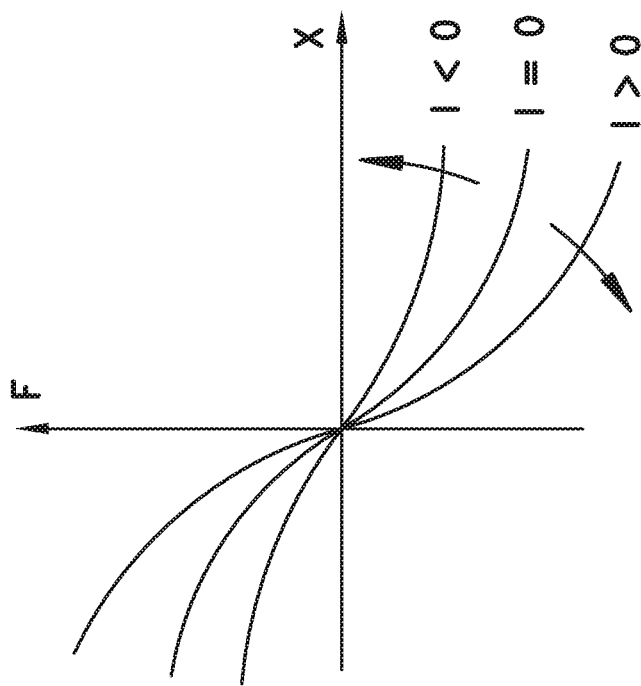
FIG. -11-
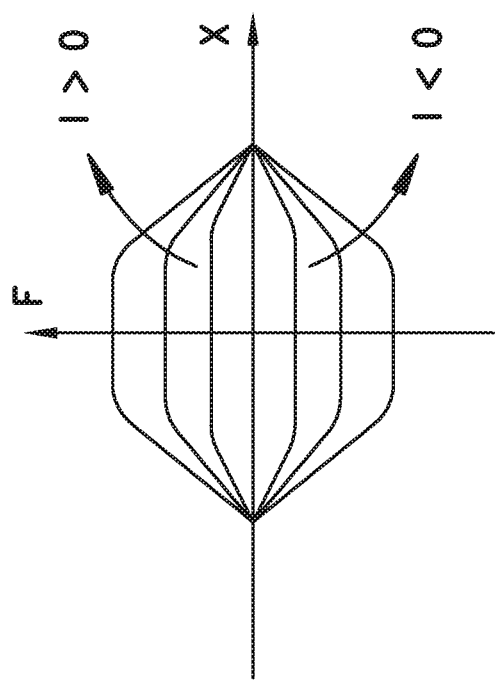
FIG. -10-

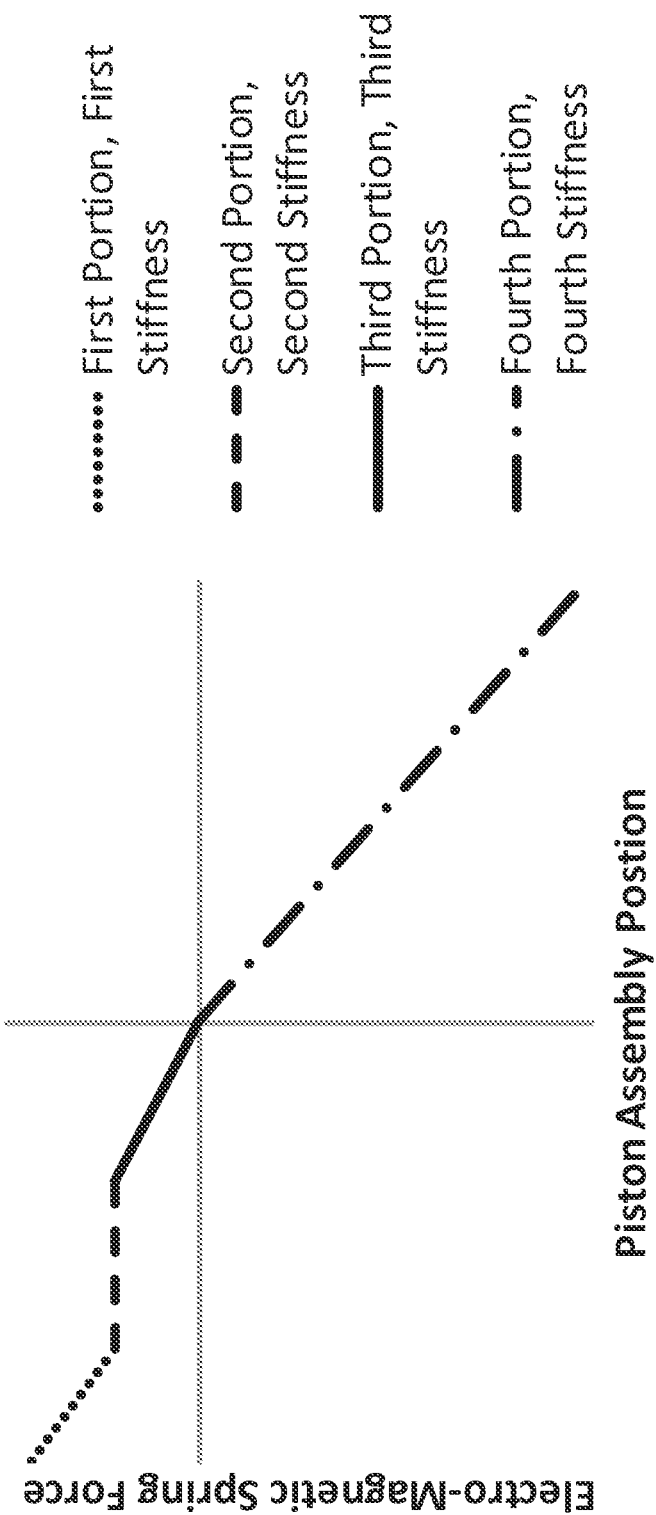
FIG. -12-

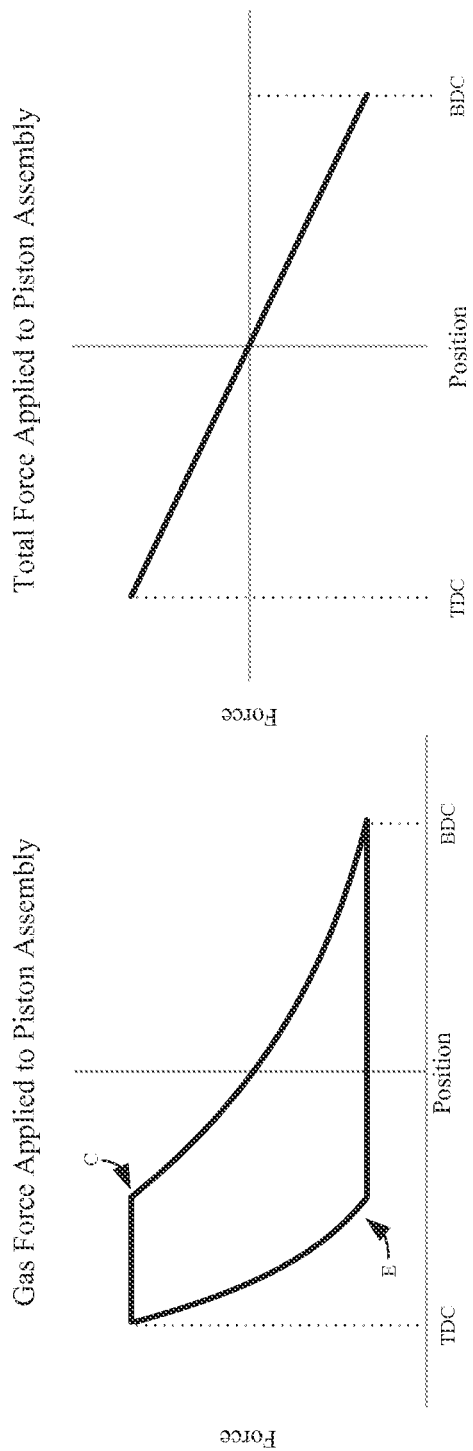
FIG. -14-
FIG. -13-

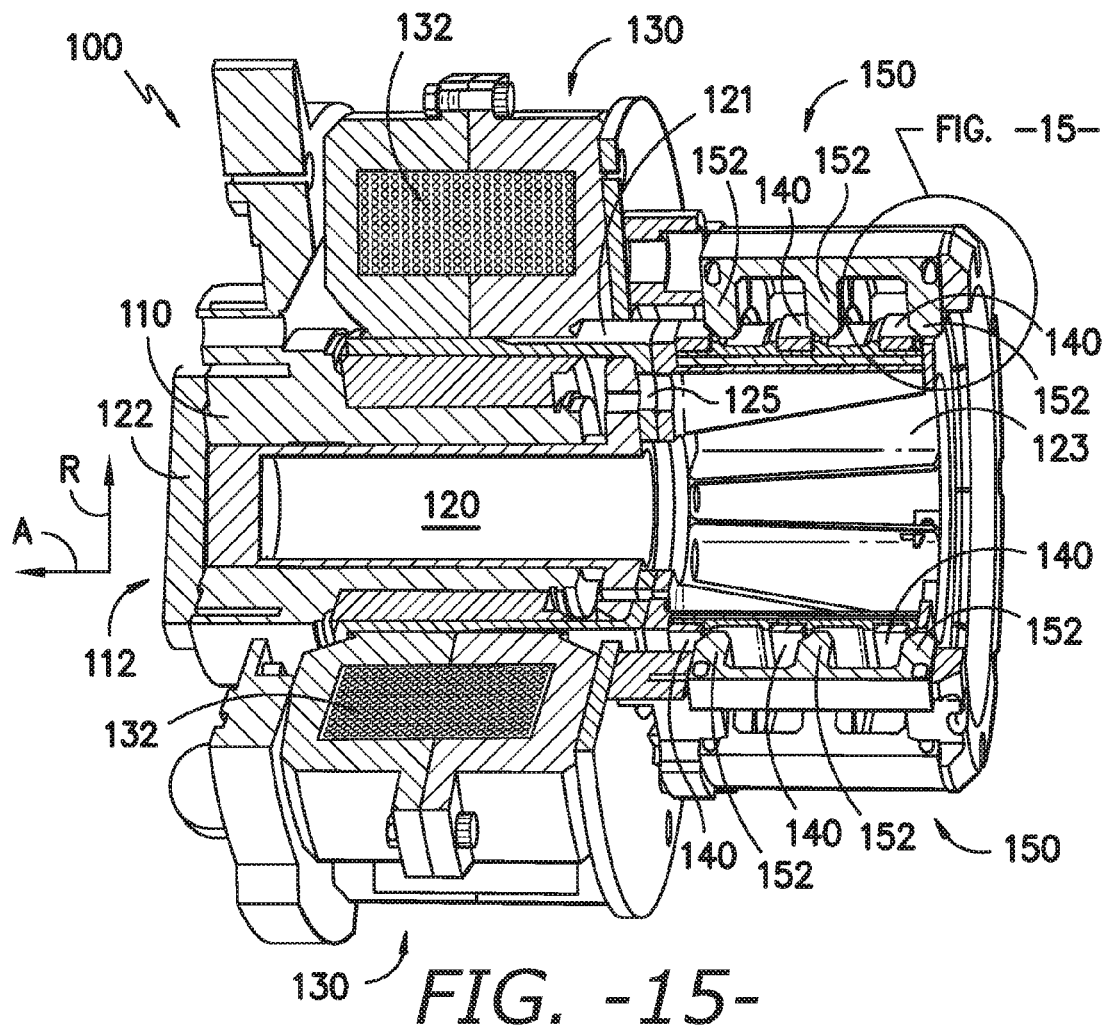
FIG. -15-
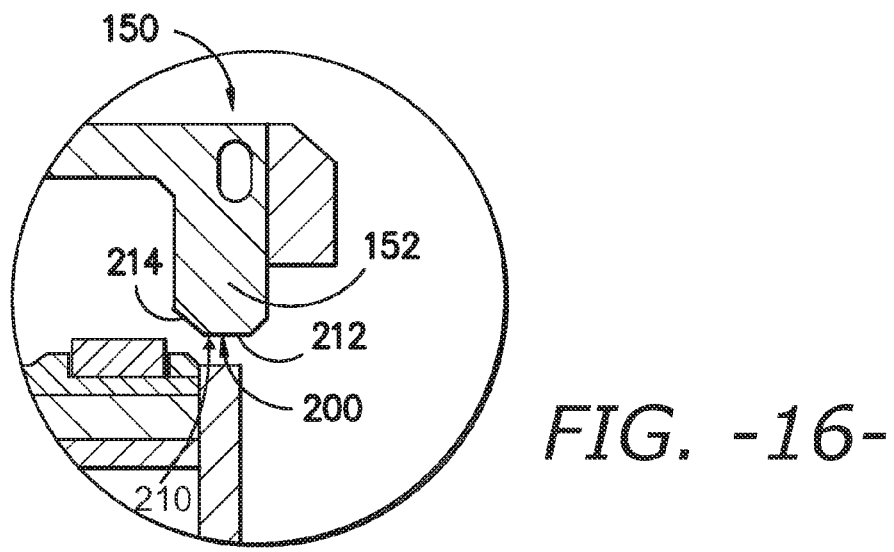
FIG. -16-

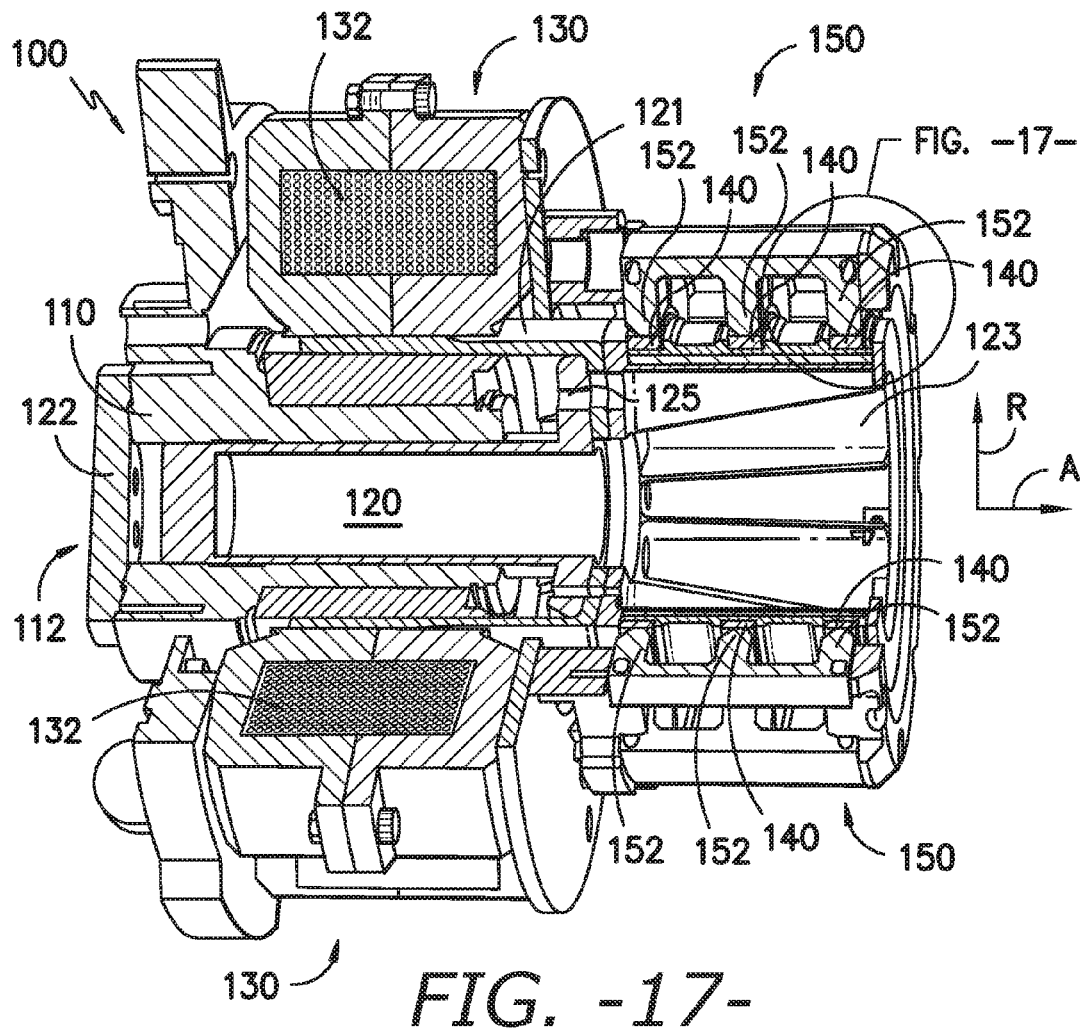
FIG. -17-
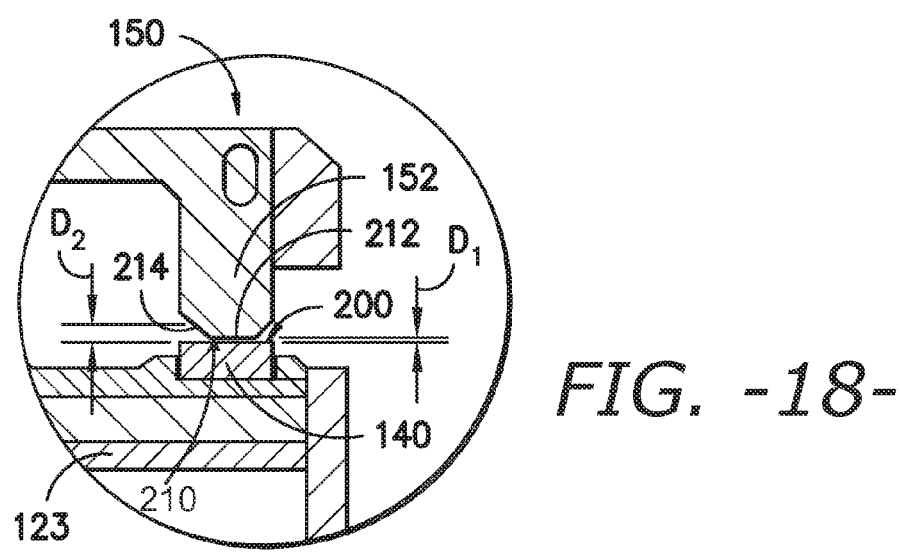
FIG. -18-

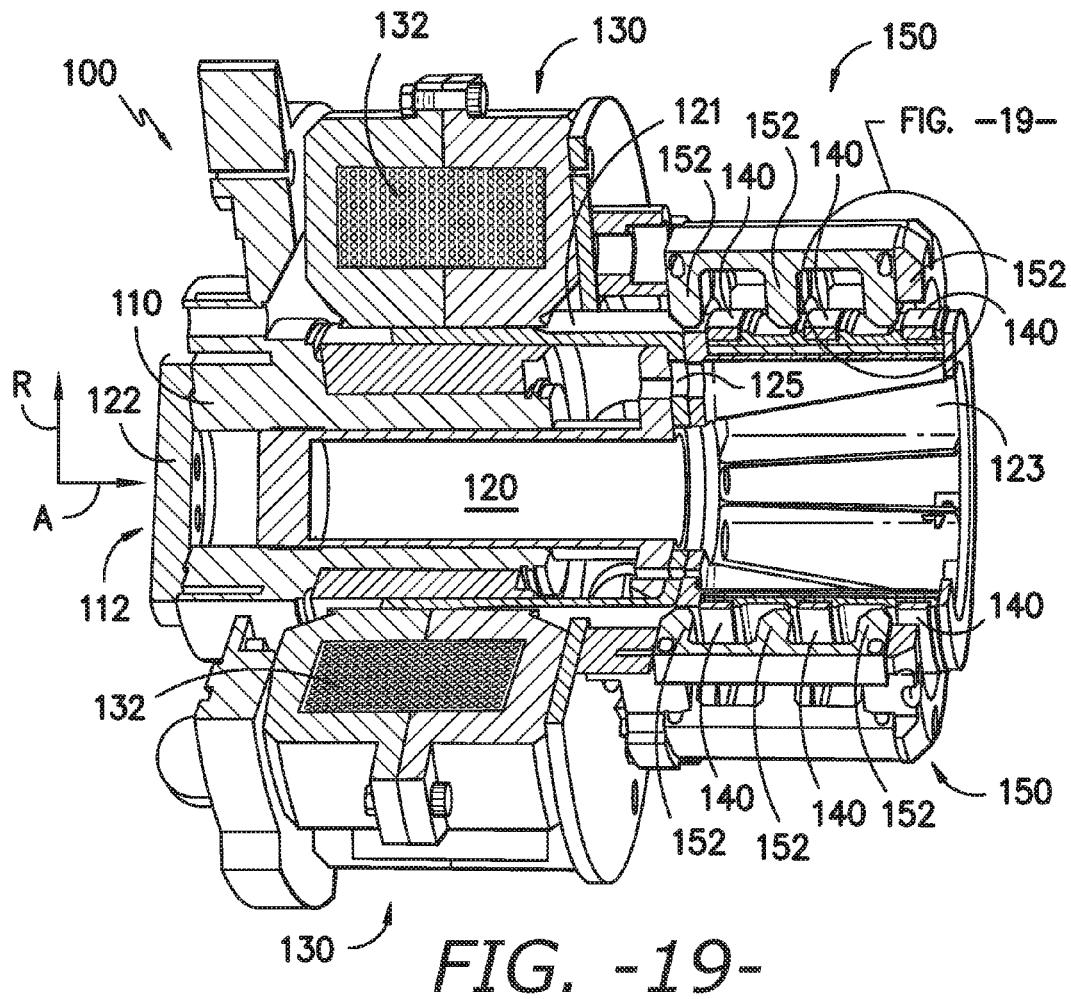
FIG. -19-
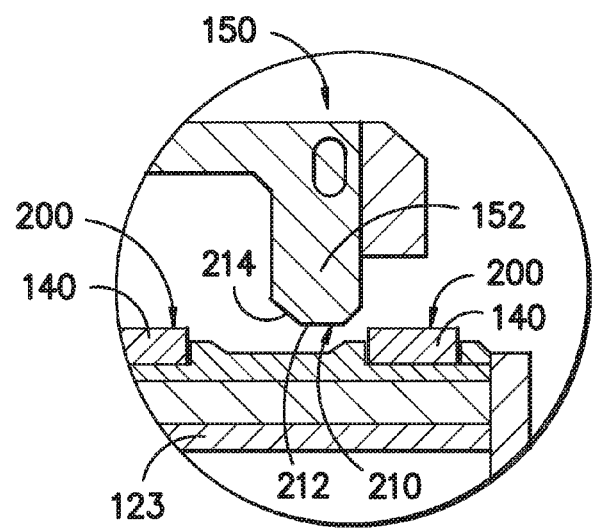
FIG. -20-

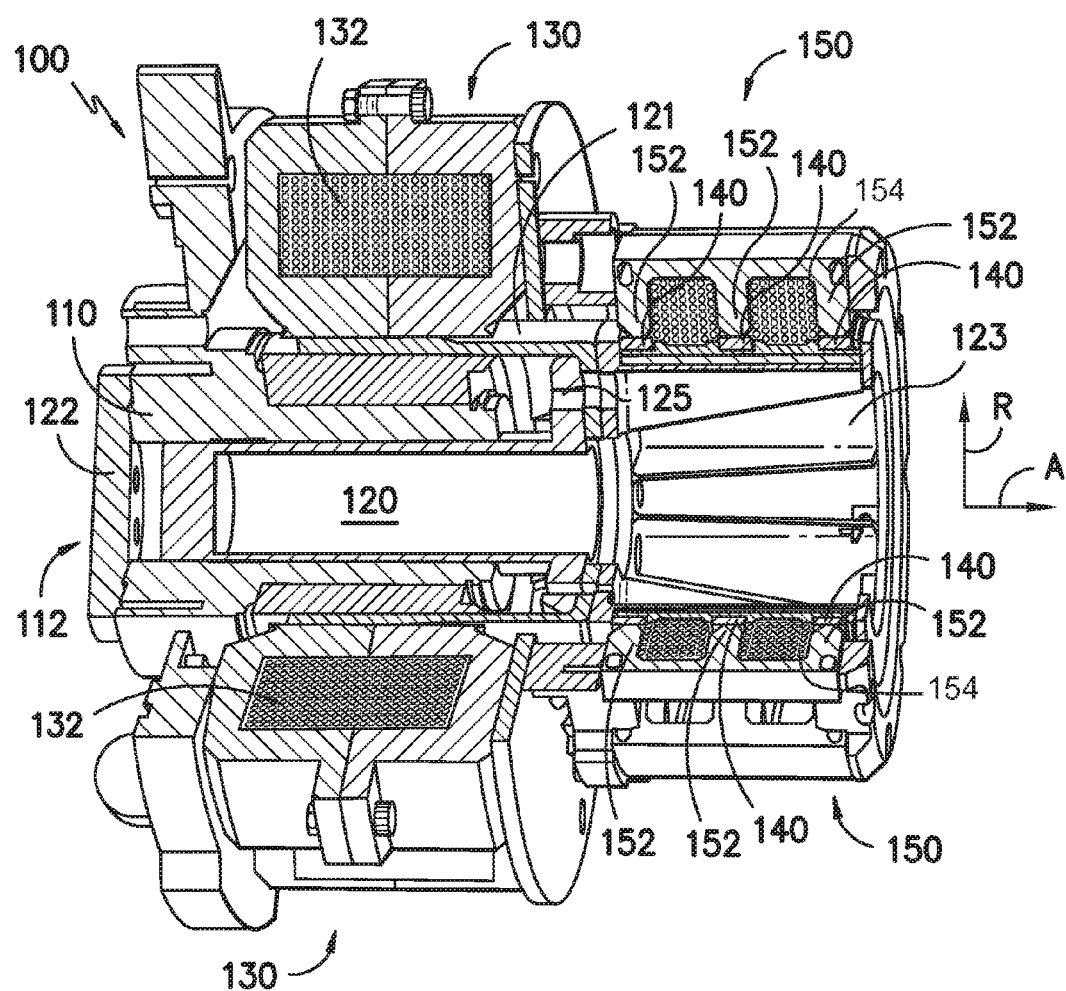
FIG. -21-

LINEAR COMPRESSOR WITH AN ELECTRO-MAGNETIC SPRING

FIELD OF THE INVENTION

The present subject matter relates generally to linear compressors, e.g., for refrigerator appliances.

BACKGROUND OF THE INVENTION

Refrigerator appliances generally include a compressor. During operation of the refrigerator appliance, the compressor operates to provide compressed refrigerant. Such compressed refrigerant is utilized to cool a compartment of the appliance and food items stored therein.

Certain refrigerator appliances include a reciprocating compressor that compresses refrigerant by sliding a piston within a chamber. Reciprocating compressors can include a piston mounted to a crankshaft. As the crankshaft turns, the piston slides within the chamber in order to compress refrigerant. However, the large number of moving parts associated with the piston and crankshaft can generate large friction forces. Such friction can result in poor efficiency and negatively affect performance of the refrigerator appliance.

Recently, linear compressors have been used to compress refrigerant in refrigerator appliances. Linear compressors can include a piston and a driving coil. The driving coil generates a force that slides the piston backward and forwards within a chamber to compress refrigerant. However, linear compressors can require active control for every piston stroke in order to stop motion of the piston at either end of displacement. Such control can be complex and expensive.

In certain linear compressors, the piston is mounted to a spring that urges the piston towards a default position. In such a configuration, the piston oscillates from the default position with an amplitude that depends on the magnitude and frequency of force applied to the piston by the driving coil. By adjusting the strength of the driving coil's force and the frequency of application of such force, the piston can slide within the chamber at a resonant frequency in which the amplitude of the piston's displacement is maximized for the force applied to the piston. However, the spring can be inefficient at storing energy during motion of the piston and negatively affect compressor performance. In addition, the total spring force applied to the piston during a compression stroke can be non-linear. Such non-linearity can decrease the efficiency of the linear compressor and negatively affect compressor performance.

Accordingly, a linear compressor with features for operating at a resonant condition would be useful. In particular, a linear compressor with features for applying a linear total spring force to a piston of the linear compressor would be useful.

BRIEF DESCRIPTION OF THE INVENTION

The present subject matter provides a linear compressor. The linear compressor includes an electro-magnetic spring and a casing that defines a chamber. A piston is received within the chamber of the casing. The electro-magnetic spring can apply a non-linear force to the piston such that a total spring force applied to the piston during a compression stroke is substantially linear. Additional aspects and advantages of the invention will be set forth in part in the following description, or may be apparent from the description, or may be learned through practice of the invention.

In a first exemplary embodiment, a linear compressor is provided. The linear compressor defines an axial direction and a radial direction. The linear compressor includes a casing defining a chamber. The chamber of the casing extends longitudinally along the axial direction. A piston assembly is received within the chamber of the casing. The piston assembly is slidable along the axial direction between a top dead center position, a default position, and a bottom dead center position. The default position is disposed between the top dead center position and the bottom dead center position along the axial direction. A driving coil is positioned proximate the piston assembly. The driving coil is configured for selectively urging the piston assembly to slide along the axial direction within the chamber of the casing. At least one spring magnet is mounted to the piston assembly. Each magnet of the at least one spring magnet has an outer surface. An electro-magnetic spring includes at least one ferromagnetic tooth. Each ferromagnetic tooth of the at least one ferromagnetic tooth has an outward surface. The outward surface of each tooth of the at least one ferromagnetic tooth is positioned proximate a respective outer surface of the at least one spring magnet. At least one outward surface of the at least one ferromagnetic tooth has a first portion and a second portion. The first portion of the outward surface is positioned a first distance from the respective outer surface of the at least one spring magnet. The second portion of the outward surface is positioned a second distance from the respective outer surface of the at least one spring magnet. The first distance is different than the second distance.

In a second exemplary embodiment, a linear compressor is provided. The linear compressor defines an axial direction and a radial direction. The linear compressor includes a casing defining a chamber. The chamber of the casing extends longitudinally along the axial direction. A piston assembly has a piston head. The piston head is received within the chamber of the casing. The piston head is slidable along the axial direction between a top dead center position, a default position, and a bottom dead center position. The default position is disposed between the top dead center position and the bottom dead center position along the axial direction. A driving coil is positioned proximate the piston assembly. The driving coil is configured for selectively urging the piston head of the piston assembly to slide along the axial direction within the chamber of the casing. At least one spring magnet is mounted to the casing. Each magnet of the at least one spring magnet has an outer surface. An electro-magnetic spring includes at least one ferromagnetic tooth. Each ferromagnetic tooth of the at least one ferromagnetic tooth has an outward surface. The outward surface of each tooth of the at least one ferromagnetic tooth is positioned proximate a respective outer surface of the at least one spring magnet. At least one outward surface of the at least one ferromagnetic tooth has a first portion and a second portion. The first portion of the outward surface is positioned a first distance from the respective outer surface of the at least one spring magnet. The second portion of the outward surface is positioned a second distance from the respective outer surface of the at least one spring magnet. The first distance is different than the second distance.

In a third exemplary embodiment, a linear compressor is provided. The linear compressor defines an axial direction and a radial direction. The linear compressor includes a casing defining a chamber. The chamber of the casing extends longitudinally along the axial direction. A piston assembly has a piston head. The piston head of the piston assembly is slidably received within the chamber of the casing. The piston head of the piston assembly is slidable along the axial direction between a bottom dead center position and a top dead center position during a compression stroke of the piston head and between the top dead center position and the bottom dead center position during an expansion stroke of the piston head. A driving coil is positioned proximate the piston assembly. The driving coil is configured for selectively urging the piston assembly to slide along the axial direction within the chamber of the casing. The linear compressor also includes means for applying a non-linear force to the piston assembly such that a total spring force applied to the piston head of the piston assembly during the compression stroke is substantially linear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a front view of a refrigerator appliance according to an exemplary embodiment of the present subject matter.

FIG. 2 is schematic view of a refrigeration system of the refrigerator appliance of FIG. 1. The refrigeration system includes a linear compressor.

FIG. 3 is a schematic view of the linear compressor of FIG. 2 according to an exemplary embodiment of the present subject matter. FIG. 3 also shows a driving coil according to an exemplary embodiment of the present subject matter and an electro-magnetic spring according to an exemplary embodiment of the present subject matter.

FIGS. 4 and 5 are schematic views of the driving coil and the electro-magnetic spring of FIG. 3, respectively. In FIGS. 4 and 5, the driving coil and electro-magnetic spring are shown in a first extended position.

FIGS. 6 and 7 are schematic views of the driving coil and the electro-magnetic spring of FIG. 3, respectively. In FIGS. 6 and 7, the driving coil and electro-magnetic spring are shown in a default position.

FIGS. 8 and 9 are schematic views of the driving coil and the electro-magnetic spring of FIG. 3, respectively. In FIGS. 8 and 9, the driving coil and electro-magnetic spring are shown in a second extended position.

FIG. 10 illustrates graphs of the force applied by the driving coil to a piston assembly of the compressor versus the position of the piston assembly for various currents flowing through the driving coil.

FIG. 11 illustrates graphs of the force applied by the electro-magnetic spring to the piston assembly versus the position of the piston assembly for various currents flowing through a spring coil.

FIG. 12 provides a graph of the non-linear force applied by the electro-magnetic spring to the piston assembly versus the position of the piston assembly. In FIG. 12, the electro-magnetic spring has a variable stiffness as the piston assembly slides away from the default position.

FIG. 13 provides a graph of the gas force applied to the piston assembly versus the position of the piston assembly.

FIG. 14 provides a graph of the total spring force applied to the piston assembly versus the position of the piston assembly.

FIGS. 15, 17, and 19 provide partial sectional views of a linear compressor according to an exemplary embodiment of the present subject matter. In FIG. 15, a piston assembly of the linear compressor is shown in a top dead center position. In FIG. 17, the piston assembly of the linear compressor is shown in a default position. In FIG. 19, the piston assembly of the linear compressor is shown in a bottom dead center position.

FIGS. 16, 18, and 20 provide partial section views of a ferromagnetic tooth of electro-magnetic spring engaging a spring magnet mounted to piston assembly. In FIG. 16, the piston assembly of the linear compressor is shown in a top dead center position. In FIG. 18, the piston assembly of the linear compressor is shown in a default position. In FIG. 20, the piston assembly of the linear compressor is shown in a bottom dead center position.

FIG. 21 provides a partial sectional view of a linear compressor according to an additional exemplary embodiment of the present subject matter. In FIG. 21, the linear compressor includes spring coils.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In the illustrated exemplary embodiment, the refrigerator appliance 10 is depicted as an upright refrigerator having a cabinet or casing 12 that defines a number of internal storage compartments. In particular, refrigerator appliance 10 includes upper fresh-food compartments 14 having doors 16 and lower freezer compartment 18 having upper drawer 20 and lower drawer 22. The drawers 20, 22 are "pull-out" drawers in that they can be manually moved into and out of the freezer compartment 18 on suitable slide mechanisms.

FIG. 2 is a schematic view of refrigerator appliance 10 including an exemplary sealed refrigeration system 60. A machinery compartment 62 contains components for executing a known vapor compression cycle for cooling air. The components include a linear compressor 100, a condenser 66, an expansion device 68, and an evaporator 70 connected in series and charged with a refrigerant. Linear compressor 100 is discussed in greater detail below. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, gaseous refrigerant flows into linear compressor 100, which operates to increase the pressure of the refrigerant. This compression of the refrigerant raises its temperature, which is lowered by passing the gaseous refrigerant through condenser 66. Within condenser 66, heat exchange with ambient air takes place so as to cool the refrigerant and cause the refrigerant to condense to a liquid state. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives liquid refrigerant from condenser 66. From expansion device 68, the liquid refrigerant enters evaporator 70. Upon exiting expansion device 68 and entering evaporator 70, the liquid refrigerant drops in pressure and vaporizes. Due to the pressure drop and phase change of the refrigerant, evaporator 70 is cool relative to compartments 14, 18 of refrigerator appliance 10. As such, cooled air is produced and configured to refrigerate compartments 14, 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through refrigeration compartments 14, 18 (FIG. 1). The refrigeration system 60 depicted in FIG. 2 is provided by way of example only. Thus, it is within the scope of the present subject matter for other configurations of the refrigeration system to be used as well.

FIG. 3 is a schematic view of linear compressor 100 according to an exemplary embodiment of the present subject matter. As may be seen in FIG. 3, linear compressor 100 is enclosed in a hermetic or air-tight shell 105. Hermetic shell 105 can, e.g., hinder or prevent refrigerant from leaking or escaping from refrigeration system 60 (FIG. 2) at linear compressor 100.

Linear compressor 100 also includes a casing 110 and defines an axial direction A. Casing 110 defines a chamber 112 that extends longitudinally along the axial direction A. Casing 110 also includes valves 116 that permit refrigerant (shown as R) to enter and exit chamber 112 during compression of refrigerant R by linear compressor 100.

A piston assembly 120 with a piston head 122 is slidably received within chamber 112 of casing 110. In particular, piston head 122 is slidable along the axial direction within chamber 112. During sliding of piston head 122 within chamber 112, piston head 122 compresses refrigerant R within chamber 112. Piston head 122 can slide between a default position, a top dead center position, and a bottom dead center position within chamber 112 as will be understood by those skilled in the art.

As an example, from the top dead center position, piston head 122 can slide within chamber 112 towards the bottom dead center position along the axial direction, i.e., an expansion stroke of piston head 122. During the expansion stroke of piston head 122, an expansion valve 117 of valves 116 permits refrigerant R to enter chamber 112 through expansion valve 117. When piston head 122 reaches the bottom dead center position, piston head 122 changes directions and slides in chamber 112 back towards the top dead center position, i.e., a compression stroke of piston head 122. During the compression stroke of piston head 122, refrigerant R that enters chamber 112 during the expansion stroke is compressed until refrigerant R reaches a particular pressure and such compressed refrigerant R exits chamber 112 through a compression valve 118 of valves 116. In such a manner, refrigerant R is compressed within chamber 112 by piston head 122.

In the exemplary embodiment shown in FIG. 3, piston assembly 120 includes an additional piston head 124 slidably received within an additional chamber 114 defined by casing 110. Additional piston head 124 is slidable along the axial direction within additional chamber 114. During sliding of additional piston head 124 within additional chamber 114, additional piston head 124 compresses refrigerant within additional chamber 114, e.g., in the same manner described above for piston head 122 within chamber 112. However, it should be understood that linear compressor 100 need not include additional piston head 124 or additional chamber 114. Thus, linear compressor 100 may have only a single piston head rather than two piston heads as shown in FIG. 3. Other suitable configurations are available as well, e.g., one, two, three, or more additional piston heads.

Piston head 122 and additional piston head 124 are coupled together with a shaft 126. Thus, shaft 126 extends between and connects piston head 122 and additional piston head 124 such that piston head 122 and additional piston head 124 simultaneously slide within chamber 112 and additional chamber 114, respectively.

Piston assembly 120 also includes a first flange 121 and a second flange 123. First flange 121 is spaced apart from second flange 123 along the axial direction A. First and second flanges 121 and 123 are also radially spaced apart from shaft 126 and extend circumferentially about shaft 126 as will be understood by those skilled in the art. Brackets 125 extend between and connect first and second flanges 121 and 123 and shaft 126, respectively.

At least one driving magnet 129, e.g., one, two, three, or more driving magnets, is mounted to first flange 121. Similarly, at least one spring magnet 140, e.g., one, two, three, four, or more spring magnets, is mounted to second flange 123. In FIG. 3, linear compressor 100 includes two spring magnets 140. However, in alternative exemplary embodiments, linear compressor 100 may include any suitable number of spring magnets 140 as discussed above. Driving magnet 129 is spaced apart from spring magnets 140, e.g., along the axial direction A. Driving magnet 129 and spring magnets 140 extend circumferentially about shaft 126 on first and second flanges 121 and 123, respectively.

Linear compressor 100 further includes a motor 130 with at least one driving coil 132. Driving coil 132 is positioned proximate first flange 121 of piston assembly 120. Driving coil 132 is configured for selectively urging piston head 122 and additional piston head 124 to slide along the axial direction A within chamber 112 and additional chamber 114, respectively. In particular, driving coil 132 receives a current from a current source 160 (FIG. 3) in order to generate a magnetic field that engages driving magnet 129 and urges piston assembly 120 to move along the axial direction A in order to compress refrigerant R within chamber 112 and additional chamber 114 as described above and will be understood by those skilled in the art. In particular, driving coil 132 can slide piston assembly 120 between the top dead center position and the bottom dead center position.

FIGS. 4 and 8 illustrate driving coil 132 receiving a current from current source 160 in order to move or slide piston assembly 120 along the axial direction A. In particular, driving coil 132 receives a positive current from current source 160 in FIG. 4 and a negative current from current source 160 in FIG. 8. Driving coil 132 urges piston assembly 120 in a first direction (e.g., towards the top dead center position) when driving coil 132 receives the positive current as shown in FIG. 4. Conversely, driving coil 132 urges piston assembly 120 in a second direction that is opposite to the first direction (e.g., towards the bottom dead center position) when driving coil 132 receives the negative current as shown in FIG. 8. As will be understood by those skilled in the art and discussed in greater detail below, movement of piston assembly 120 can be controlled by adjusting the magnitude of the current from current source 160, the direction of the current from current source 160, and the frequency that current is applied to driving coil 132 by current source 160.

The magnitude, direction, and frequency of current supplied to driving coil 160 and/or spring coil 154 (described below) can be regulated or controlled with a processing device or controller (not shown). The controller may include a memory and microprocessor, such as a general or special purpose microprocessor operable to execute programming instructions or micro-control code associated with operation of the refrigerator appliance 10. The memory may represent random access memory such as DRAM, or read only memory such as ROM or FLASH. In one embodiment, the processor executes programming instructions stored in memory. The memory may be a separate component from the processor or may be included onboard within the processor.

Turning back to FIG. 3, linear compressor 100 also includes an electro-magnetic spring 150. Electro-magnetic spring 150 is positioned proximate spring magnets 140 and second flange 123 of piston assembly 120. In particular, electro-magnetic spring 150 includes at least one ferromagnetic tooth 152, e.g., one, two, three, four, or more ferromagnetic teeth. In FIG. 3, electro-magnetic spring 150 includes two ferromagnetic teeth 152. However, in alternative exemplary embodiments, electro-magnetic spring 150 may include any suitable number of ferromagnetic teeth as discussed above. Each ferromagnetic tooth of ferromagnetic teeth 152 is positioned proximate a respective one of the spring magnets 140. Ferromagnetic teeth 152 may include any suitable ferromagnetic material, e.g., iron, or combination of ferromagnetic materials and/or non-ferromagnetic materials. Electro-magnetic spring 150 is configured for urging piston assembly 120 towards about the default position when piston assembly 120 is positioned away from the default position.

FIGS. 5 and 9 illustrate electro-magnetic spring 150 urging piston assembly 120 towards the default position along the axial direction A. In particular, electro-magnetic spring 150 urges piston assembly 120 towards the default position from the top dead center position along the axial direction A as shown in FIG. 5 and towards the default position from the bottom dead center position along the axial direction A in FIG. 9. Thus, when driving coil 132 urges piston assembly 120 in the first direction (e.g., towards the top dead center position) as shown in FIG. 4, electro-magnetic spring 150 urges piston assembly 120 towards the default position as shown in FIG. 5. Conversely, when driving coil 132 urges piston assembly 120 in the second direction (e.g., towards the bottom dead center position) as shown in FIG. 8, electro-magnetic spring 150 urges piston assembly 120 towards the default position as shown in FIG. 9. Thus, as discussed above, electro-magnetic spring 150 urges piston assembly 120 towards about the default position when piston assembly 120 is positioned away from the default position.

FIG. 7 illustrates electro-magnetic spring 150 positioning piston assembly 120 at about the default position. As may be seen in FIG. 7, each ferromagnetic tooth 152 faces (e.g., is radially aligned with) a respective one of the spring magnets 140 when piston assembly 120 is positioned in about the default position. Electro-magnetic spring 150 positions piston assembly 120 at about the default position as shown in FIG. 7 when substantially no current (e.g., about zero amps) is applied to driving coil 132 by current source 160 as shown in FIG. 6. Thus, the default position may be an equilibrium position for piston assembly 120 due to electro-magnetic spring 150. Accordingly, driving coil 132 can selectively urge piston assembly 120 away from the equilibrium position, and electro-magnetic spring 150 will urge piston assembly 120 towards the equilibrium position as discussed in greater detail below.

FIG. 10 illustrates graphs of the force applied by driving coil 132 to piston assembly 120 versus the position of piston assembly 120 for various currents supplied to driving coil 132 by current source 160. As may be seen in FIG. 10, the force applied to piston assembly 120 by driving coil 132 is positively correlated with the current supplied to driving coil 132 by current source 160, i.e., the force applied to piston assembly 120 by driving coil 132 increases as the magnitude of current supplied to driving coil 132 by current source 160 increases. In addition, the direction of the force applied to piston assembly 120 by driving coil 132 changes direction when the current supplied to driving coil 132 by current source 160 changes between positive and negative.

In particular, driving coil 132 applies a positive force to piston assembly 120 when driving coil 132 receives a positive current, e.g., from current supply 160, and the magnitude of the positive force applied by driving coil 132 to piston assembly 120 increases as the magnitude of the positive current increases. Conversely, driving coil 132 applies a negative force to piston assembly 120 when driving coil 132 receives a negative current, e.g., from current supply 160, and the magnitude of the negative force applied by driving coil 132 to piston assembly 120 increases as the magnitude of the negative current increases.

Turning back to FIG. 3, electro-magnetic spring 150 also includes a spring coil 154. Spring coil 154 is positioned between two teeth of the ferromagnetic teeth 152 along the axial direction A and is also positioned adjacent two magnets of the spring magnets 140. Spring coil 154 can receive a current, e.g., from current source 160, to adjust electro-magnetic spring 150 as discussed in greater detail below.

FIG. 11 illustrates graphs of the force applied by electro-magnetic spring 150 to piston assembly 120 versus the position of piston assembly 120 for various currents flowing through a spring coil 154 of electro-magnetic spring 150. As may be seen in FIG. 11, the force applied to piston assembly 120 by electro-magnetic spring 150 is zero or about zero when piston assembly 120 is located at the default position (when x=0 in FIG. 11). On the other hand, the force applied to piston assembly 120 by electro-magnetic spring 150 is positive when piston assembly 120 is located between the top dead center position and the default position (when x is negative in FIG. 11), and the force applied to piston assembly 120 by electro-magnetic spring 150 is negative when piston assembly 120 is located between the bottom dead center position and the default position (when x is positive in FIG. 11).

By controlling the forces applies to piston assembly 120 by driving coil 132 and electro-magnetic spring 150, piston assembly 120 can be driven at a resonant frequency. In particular, as will be understood by those skilled in the art, piston assembly 120 can be driven at the resonant frequency by controlling the magnitude of force applied to piston assembly 120 and the frequency that such force is applied to piston assembly 120.

Thus, as an example, when driving coil 132 applies a positive force to piston assembly 120 and urges piston assembly 120 to the top dead center position as shown in FIG. 4, electro-magnetic spring 150 applies a negative force to piston assembly 120 and urges piston assembly 120 towards the default position as shown in FIG. 5. Conversely, when driving coil 132 applies a negative force to piston assembly 120 and urges piston assembly 120 to the bottom dead center position as shown in FIG. 8, electro-magnetic spring 150 applies a positive force to piston assembly 120 and urges piston assembly 120 towards the default position as shown in FIG. 9. Utilizing electro-magnetic spring 150, piston assembly 120 can be driven at the resonant frequency to permit periodic driving forces applied by driving coil 142 to piston assembly 120 to produce large amplitude oscillations of piston assembly 120 and piston head 122 within chamber 112 as will be understood by those skilled in the art.

In addition, spring coil 154 can be utilized to adjust the resonant frequency of linear compressor 100. For example, as shown in FIG. 11, by adjusting the magnitude of current flowing through spring coil 154, the force applied by electro-magnetic spring 150 to piston assembly 120 and/or the stiffness of electro-magnetic spring 150 can be increased or decreased. Such changes in force applied by electro-magnetic spring 150 can permit tuning of the resonant frequency, e.g., by tuning the stiffness of electro-magnetic spring 150. In particular, by applying a negative current to spring coil and thereby reducing the force applied by electro-magnetic spring 150 to piston assembly 120 during movement of piston assembly 120 away from the default position, the resonant frequency of the linear compressor 100 can be reduced. Conversely, by applying a positive current to spring coil and thereby increasing the force applied by electro-magnetic spring 150 to piston assembly 120 during movement of piston assembly 120 away from the default position, the resonant frequency of the linear compressor 100 can be increased.

In addition, as may be seen in FIGS. 5, 7, and 9, each ferromagnetic tooth 152 is spaced apart from a respective one of the spring magnets 140 by a gap 170. Gap 170 may be selected in order to adjust the magnitude of the force between ferromagnetic teeth 152 and spring magnets 140. As an example, gap 170 may be about half a millimeter. In alternative exemplary embodiments, any suitable value for gap 170 may be selected to facilitate operation of linear compressor 100.

In addition to adjusting the resonant frequency of linear compressor 100, a non-linear force can be applied by electro-magnetic spring 150 to piston assembly 120 such that the total spring force applied to piston assembly 120 is substantially linear. By tuning electro-magnetic spring 150 in such a manner, linear compressor 100 may operate more efficiently in the resonant condition described above.

As will be understood by those skilled in the art, refrigerant R compressed by piston assembly 150 applies a force to piston assembly 150. In particular, the force applied by refrigerant R to piston assembly 120 can be non-linear. For example, refrigerant R can apply a much stronger force to piston assembly 120 on the compression stroke relative to the expansion stroke. Such non-linear forces can create an unbalanced cycle within the linear compressor 100 and negatively affect the operation and efficiency of linear compressor 100.

FIG. 12 provides a graph of the non-linear force applied by electro-magnetic spring 150 to piston assembly 120 versus the position of the piston assembly 120. In FIG. 12, electro-magnetic spring 150 has a stiffness that varies as piston assembly 100 slides away from the default position (when x=0 in FIG. 12). In particular, as may be seen in FIG. 12, electro-magnetic spring 150 has four distinct portions, a first portion, a second portion, a third portion, and a fourth portion. Each portion has a unique stiffness, e.g., a first stiffness for the first portion, a second stiffness for the second portion, a third stiffness for the third portion, and a fourth stiffness for the fourth portion. As an example, the first stiffness may be about eighty-seven newtons per millimeter, the second stiffness may be constant or flat, the third stiffness may be about forty newtons per millimeter, and the fourth stiffness may be about sixty-seven newtons per millimeter. However, in alternative exemplary embodiments, each stiffness may be any suitable value or shape, e.g., to provide electro-magnetic spring 150 with the desired configuration or characteristics. In particular, any stiffness can be non-linear rather than linear as shown in FIG. 12.

To achieve the above described changes in stiffness, the current supplied to spring coil 154, e.g., by current source 160, may be adjusted during operation of linear compressor 100. Such changes in current supplied to spring coil 154 result in corresponding changes in the non-linear force applied to piston assembly 120 as described above. Thus, spring coil 154 can be used to tune electro-magnetic spring 150 such that a stiffness of electro-magnetic spring 150 changes as piston assembly 120 slides within chamber 112.

By tuning electro-magnetic spring 150 in such a manner, linear compressor 100 may operate more efficiently in the resonant condition. In particular, such tuning can mitigate the undesirable non-linear forces applied to piston assembly 120 by refrigerant R during operation of linear compressor 100. Thus, such tuning can permit linear compressor 100 to operate in a more linear and balanced manner such that the linear compressor 100 can operate more efficiently at the resonance condition.

FIG. 13 provides a graph of the gas spring force applied to piston assembly 120 by refrigerant R during operation of linear compressor 100. In particular, the portion of the graph between the TDC (top dead center) position and the BDC (bottom dead center) position labeled with C is the force applied by refrigerant R during the compression stroke of piston assembly 120. Conversely, the portion of the graph between the TDC position and the BDC position labeled with E is the force applied by refrigerant R during the expansion stroke of piston assembly 120. As may be seen in FIG. 13, the force applied to piston assembly 120 by refrigerant R is non-linear.

FIG. 14 provides a graph of the total spring force applied to piston assembly 120 (e.g., the force applied to piston assembly 120 by refrigerant R shown in FIG. 13 and the non-linear force applied by electro-magnetic spring 150 as shown in FIG. 12) versus the position of piston assembly 120. In particular, the total spring force applied to piston assembly 120 is about linear during the compression stroke of linear compressor 100. Thus, using the tuning of electro-magnetic spring 150 described above, the total spring force applied to piston assembly 120 during the compression stroke of linear compressor 100 can be shaped or tuned to improve performance of linear compressor 100 by adjusting the current supplied to spring coil 154 as described above. However, as discussed further below, electro-magnetic spring 150 can also be configured to operate passively, i.e., without spring coil 154, such that the total spring force applied to piston assembly 120 during the compression stroke of linear compressor 100 is substantially linear.

It should be understood that the graph shown in FIG. 14 is provided by way of example only and presents an ideal operating condition for linear compressor 100. For example, such operating conditions can require both active and passive operation of electro-magnetic spring 150. Accordingly, the total force applied to piston assembly 120 during operation of linear compressor 100 can vary from that shown in FIG. 14. For example, the total force applied to piston assembly 120 during the expansion stroke can be non-linear, e.g., in the passive embodiments described below.

FIGS. 15, 17, and 19 provide partial sectional views of linear compressor 100 according to an exemplary embodiment of the present subject matter. In FIG. 15, piston assembly 120 of linear compressor 100 is shown in a top dead center position. In FIG. 17, piston assembly 120 of linear compressor 100 is shown in a default position. In FIG. 19, piston assembly 120 of linear compressor 100 is shown in a bottom dead center position. The exemplary embodiment shown in FIGS. 15, 17, and 19 does not include spring coil 154 (FIG. 3). Thus, electro-magnetic spring 150 is passive in the exemplary embodiment shown in FIGS. 15, 17, and 19.

Also, in the exemplary embodiment shown in FIGS. 15, 17, and 19 linear compressor 100 includes three spring magnets 140 that are uniformly distributed along the axial direction A. However, in alternative exemplary embodiments, linear compressor 100 may include any suitable number of spring magnets 140, e.g., one, two, four, five, or more. Spring magnets 140 extend circumferentially about second flange 123 of piston assembly 120.

Exemplary ferromagnetic teeth 152 are also shown engaging spring magnets 140 in FIGS. 15 and 19 in order to urge piston assembly 120 towards the default position shown in FIG. 17. In particular, each ferromagnetic tooth of the ferromagnetic teeth 152 is radially misaligned with a respective one of the spring magnets 140 when piston assembly 120 is positioned in the top dead center position as shown in FIG. 15 or the bottom dead center position as shown in FIG. 19. Conversely, each ferromagnetic tooth of the ferromagnetic teeth 152 is radially aligned with a respective one of the spring magnets when piston assembly 120 is positioned in about the default position as shown in FIG. 17.

Electro-magnetic spring 150 shown in FIGS. 15, 17, and 19 is configured to operate passively, i.e., without spring coil 154, such that the total spring force applied to piston assembly 120 during the compression stroke of linear compressor 100 is substantially linear. In particular, as discussed in greater detail below, each tooth of the ferromagnetic teeth 152 has an outward surface 210 (FIG. 16) that is contoured. By adjusting the contours of outward surface 210, the stiffness of electro-magnetic spring 150 can be adjusted or tuned, e.g., in the manner described above.

FIGS. 16, 18, and 20 provide partial section views of one of ferromagnetic teeth 152 of electro-magnetic spring 150 engaging spring magnet 140 mounted to piston assembly 120. In FIG. 16, the piston assembly 120 is shown in a top dead center position. In FIG. 18, the piston assembly 120 is shown in a default position. In FIG. 20, the piston assembly 120 is shown in a bottom dead center position.

As may be seen in FIG. 16, outward surface 210 of ferromagnetic teeth 152 is positioned proximate spring magnet 140. In particular, as shown in FIG. 18, outward surface 210 of ferromagnetic teeth 152 faces or opposes an outer surface 200 of spring magnet 140 when piston assembly 120 is in the default position. Also, outward surface 210 of ferromagnetic teeth 142 has a first portion 212 and a second portion 214. First portion 212 of outward surface is positioned a first distance $D_1$ from outer surface 200 of spring magnet 140. Conversely, second portion 214 of outward surface 210 is positioned a second distance $D_2$ from outer surface 200 of spring magnet 140. The first distance $D_1$ is different than the second distance $D_2$. Thus, the outward surface 210 of ferromagnetic tooth 152 is contoured such that the outward surface 210 is not flat and/or wholly parallel to outer surface 200 of spring magnet 140. However, in alternative embodiments, outer surface 200 spring magnet 140 may be contoured rather than outward surface 210 of ferromagnetic tooth 152 or both outer surface 200 of spring magnet 140 and outward surface 210 of ferromagnetic tooth may be contoured.

As will be understood by those skilled in the art, the strength of the force applied by spring magnet 140 to ferromagnetic tooth 152 is affected by the proximity of spring magnet 140 to ferromagnetic tooth 152. Thus, by contouring outward surface 210 of ferromagnetic tooth 152 and/or outer surface 200 of spring magnet 140, the distance between spring magnet 140 and ferromagnetic tooth 152 can be adjusted to affect the force applied by electro-magnetic spring 150 to piston assembly 120.

As an example, the outer surface 200 of spring magnet 140 and outward surface 210 of ferromagnetic tooth 152 slide past one another as piston assembly 120 slides within casing 110 from the top dead center position (FIG. 16) to the default position (FIG. 18) and the bottom dead center position (FIG. 20). Because the first distance $D_1$ is different than the second distance $D_2$ and the outward surface 210 is contoured, the electro-magnetic spring 150 can have the varying stiffness shown in FIG. 12 by selecting the appropriate contouring of outward surface 210 of ferromagnetic tooth 152. In such a manner, electro-magnetic spring 150 can be configured to operate passively such that the total spring force applied to piston assembly 120 during the compression stroke of linear compressor 100 is substantially linear.

FIG. 21 provides a partial sectional view of linear compressor 100 according to an additional exemplary embodiment of the present subject matter. In FIG. 16, linear compressor 100 includes spring coils 154 mounted between ferromagnetic teeth 152. Thus, electro-magnetic spring 150 may be passive or active in the exemplary embodiment shown in FIG. 21.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A linear compressor, the linear compressor defining an axial direction and a radial direction, the linear compressor comprising:

a casing defining a chamber, the chamber of said casing extending longitudinally along the axial direction;

a piston received within the chamber of said casing, said piston slidable along the axial direction between a top dead center position, a default position, and a bottom dead center position, the default position being disposed between the top dead center position and the bottom dead center position along the axial direction;

a driving coil positioned proximate said piston, said driving coil configured for selectively urging said piston to slide along the axial direction within the chamber of said casing;

at least one spring magnet mounted to said piston, each magnet of said at least one spring magnet having an outer surface; and an electro-magnetic spring comprising at least one ferromagnetic tooth, each ferromagnetic tooth of the at least one ferromagnetic tooth having an outward surface, the outward surface of each ferromagnetic tooth of said at least one ferromagnetic tooth positioned proximate a respective outer surface of said at least one spring magnet, the outward surface of each ferromagnetic tooth of said at least one ferromagnetic tooth facing and exposed to the respective outer surface of said at least one spring magnet, at least one outward surface of said at least one ferromagnetic tooth having a first portion and a second portion, the first portion of the outward surface positioned a first distance from the respective outer surface of said at least one spring magnet, the second portion of the outward surface positioned a second distance from the respective outer surface of said at least one spring magnet, the first distance being different than the second distance.

2. The linear compressor of claim 1, wherein:

each outward surface of the at least one ferromagnetic tooth is aligned with the respective outer surface of said at least one spring magnet along the radial direction when said piston is positioned at about the default position; and each outward surface of the at least one ferromagnetic tooth is misaligned with the respective outer surface of said at least one spring magnet along the radial direction when said piston is positioned at the top dead center position or the bottom dead center position.

3. The linear compressor of claim 1, wherein a stiffness of said electro-magnetic spring changes as said piston slides within the chamber of said casing between the top dead center position and the bottom dead center position.

4. The linear compressor of claim 1, wherein said electro-magnetic spring further comprises a control coil positioned adjacent said at least one ferromagnetic tooth.

5. The linear compressor of claim 4, wherein said control coil is configured for receiving an electrical current and adjusting a stiffness of said electro-magnetic spring.

6. The linear compressor of claim 1, wherein said casing defines as additional chamber that extends along the axial direction, wherein said piston comprises a first piston head and a second piston head, the first piston head slidably received within the chamber of said casing, the second piston head slidably received within the additional chamber of said casing, the first and second piston heads coupled together such that the first and second piston heads slide simultaneously with the chamber and the additional chamber, respectively.

7. The linear compressor of claim 1, further comprising at least one driving magnet mounted to said piston and positioned proximate said driving coil, said at least one driving magnet spaced apart from said at least one spring magnet along the axial direction.

8. The linear compressor of claim 1, wherein said at least one spring magnet and the at least one ferromagnetic tooth of said electromagnetic spring are uniformly distributed along the axial direction.

9. A linear compressor, the linear compressor defining an axial direction and a radial direction, the linear compressor comprising:

a casing defining a chamber, the chamber of said casing extending longitudinally along the axial direction;

a piston having a piston head, the piston head of said piston slidably received within the chamber of said casing, said piston slidable along the axial direction between a top dead center position, a default position, and a bottom dead center position, the default position being disposed between the top dead center position and the bottom dead center position along the axial direction;

a driving coil positioned proximate said piston, said driving coil configured for selectively urging the piston head of said piston to slide along the axial direction within the chamber of said casing;

at least one spring magnet mounted to said casing; and an electro-magnetic spring comprising at least one ferromagnetic tooth, each ferromagnetic tooth of the at least one ferromagnetic tooth having an outward surface, the outward surface of each ferromagnetic tooth of said at least one ferromagnetic tooth positioned proximate a respective outer surface of said at least one spring magnet, the outward surface of each ferromagnetic tooth of said at least one ferromagnetic tooth facing and exposed to the respective outer surface of said at least one spring magnet, at least one outward surface of said at least one ferromagnetic tooth having a first portion and a second portion, the first portion of the outward surface positioned a first distance from the respective outer surface of said at least one spring magnet, the second portion of the outward surface positioned a second distance from the respective outer surface of said at least one spring magnet, the first distance being different than the second distance.

10. The linear compressor of claim 9, wherein, the contoured surface of each ferromagnetic tooth of the at least one ferromagnetic tooth is aligned with the respective one of said at least one spring magnet along the radial direction when the piston head of said piston is positioned in about the default position; and, wherein, the contoured surface of each ferromagnetic tooth of the at least one ferromagnetic tooth is misaligned with the respective one of said at least one spring magnet along the radial direction when the piston head of said piston is positioned in about the top dead center position or about the bottom dead center position.

11. The linear compressor of claim 10, wherein, a stiffness of said electro-magnetic spring changes when the contoured surface of each ferromagnetic tooth of the at least one ferromagnetic tooth aligns and misaligns with the respective one of said at least one spring magnet along the radial direction.

12. The linear compressor of claim 9, wherein said electro-magnetic spring further comprises a control coil positioned adjacent said at least one ferromagnetic tooth.

13. The linear compressor of claim 12, wherein said control coil is configured for receiving an electrical current and adjusting the stiffness of said electro-magnetic spring.

14. The linear compressor of claim 9, wherein said casing defines as additional chamber that extends along the axial direction, wherein said piston further comprises an additional piston head spaced apart from the piston head of said piston along the axial direction, the additional piston head slidably received within the additional chamber of said casing, the piston head and the additional piston head coupled together such that the piston head and the additional piston head slide simultaneously with the chamber and the additional chamber, respectively.

15. The linear compressor of claim 9, wherein said driving coil is mounted to said casing.

16. The linear compressor of claim 9, further comprising at least one driving magnet mounted to said piston and positioned proximate said driving coil, said at least one driving magnet spaced apart from said at least one spring magnet along the axial direction.

17. The linear compressor of claim 9, wherein said at least one spring magnet and the at least one ferromagnetic tooth of said electromagnetic spring are uniformly distributed along the axial direction.

18. A linear compressor, the linear compressor defining an axial direction, the linear compressor comprising:
- a casing defining a chamber, the chamber of said casing extending longitudinally along the axial direction;
- a piston having a piston head, the piston head of said piston slidably received within the chamber of said casing, the piston head of said piston slidable along the axial direction between a bottom dead center position and a top dead center position during a compression stroke of the piston head and between the top dead center position and the bottom dead center position during an expansion stroke of the piston head, gas within the chamber applying a non-linear gas force to the piston head during motion of the piston between the bottom and top dead center positions; and
- a driving coil positioned proximate said piston, said driving coil configured for selectively urging the piston head of said piston to slide along the axial direction within the chamber of said casing; and
- means for applying a non-linear force to said piston such that a total spring force applied to the piston head of said piston during the compression stroke is substantially linear.

19. The linear compressor of claim 18, wherein said means for applying comprises a spring coil and a current source, the spring coil being in electrical communication with the current source in order to receive a current from said current source.

20. The linear compressor of claim 19, wherein said means for applying further comprises at least one spring magnet mounted to said piston.

* * * * *